(12) United States Patent
Shiels et al.

(10) Patent No.: US 12,024,297 B2
(45) Date of Patent: Jul. 2, 2024

(54) AIRCRAFT SEAT WITH MECHANISM FOR SEAT ACTUATION

(71) Applicant: Safran Seats GB Limited, Cwmbran (GB)

(72) Inventors: Christopher Shiels, Cwmbran (GB); Clive Pearce, Cwmbran (GB); Louis Flanagan, Cwmbran (GB)

(73) Assignee: Safran Seats GB Limited, Cwmbran (GB)

(*) Notice: Subject to any disclaimer, the term of this patent is extended or adjusted under 35 U.S.C. 154(b) by 231 days.

(21) Appl. No.: 17/620,044

(22) PCT Filed: Jul. 17, 2020

(86) PCT No.: PCT/GB2020/051718
§ 371 (c)(1),
(2) Date: Dec. 16, 2021

(87) PCT Pub. No.: WO2021/023966
PCT Pub. Date: Feb. 11, 2021

(65) Prior Publication Data
US 2022/0306299 A1   Sep. 29, 2022

(30) Foreign Application Priority Data
Aug. 7, 2019  (GB) ........................... 1911278

(51) Int. Cl.
*B60N 2/34* (2006.01)
*B60N 2/20* (2006.01)
(Continued)

(52) U.S. Cl.
CPC ........ *B64D 11/0641* (2014.12); *B60N 2/2209* (2013.01); *B60N 2/34* (2013.01)

(58) Field of Classification Search
CPC ..... B64D 11/0641; B60N 2/34; B60N 2/2209
(Continued)

(56) References Cited

U.S. PATENT DOCUMENTS 5,261,725 A * 11/1993 Rudolph .................. A47C 9/02
297/DIG. 10
6,059,364 A * 5/2000 Dryburgh ........... B64D 11/0601
244/118.6
(Continued)

FOREIGN PATENT DOCUMENTS

EP  3118115 A1  1/2017
EP  3385115 A1  10/2018
(Continued)

OTHER PUBLICATIONS

International Patent Application No. PCT/GB2020/051718, International Search Report and Written Opinion, dated Nov. 19, 2020.
(Continued)

*Primary Examiner* — Rodney B White
(74) *Attorney, Agent, or Firm* — Kilpatrick Townsend & Stockton LLP

(57) ABSTRACT

An actuation mechanism may control the movement of an aircraft seat between an upright position and a bed position. The aircraft seat comprises a back rest and connected seat pan with an actuator for moving the seat between an upright position and a bed position. The seat pan comprises a cam follower (32). The cam follower (32) is arranged to move along a first cam path (38) when the aircraft seat is moved from the upright position to the bed position. It is further arranged to move along a second cam path (40) when the seat is moved from the bed position to the upright position.

14 Claims, 6 Drawing Sheets

(51) Int. Cl.
*B64D 11/06* (2006.01)
*B60N 2/22* (2006.01)

(58) Field of Classification Search
USPC .................................................. 297/118, 342
See application file for complete search history.

(56) References Cited

U.S. PATENT DOCUMENTS

| | | | | |
|---|---|---|---|---|
| 6,227,489 | B1* | 5/2001 | Kitamoto | B64D 11/0643 244/118.6 |
| 6,305,644 | B1* | 10/2001 | Beroth | B64D 11/00 297/354.13 |
| 6,692,069 | B2* | 2/2004 | Beroth | B64D 11/064 297/118 X |
| 7,390,060 | B2* | 6/2008 | Kristen | A47C 1/0352 297/343 |
| 7,472,957 | B2* | 1/2009 | Ferry | B60N 2/34 244/118.6 |
| 7,600,817 | B2* | 10/2009 | Kramer | A47C 1/023 297/DIG. 10 |
| 8,113,573 | B2* | 2/2012 | Lawson | B64D 11/06395 297/118 |
| 8,403,415 | B2* | 3/2013 | Lawson | B64D 11/064 297/354.13 |
| 8,419,123 | B2* | 4/2013 | Hankinson | B64D 11/0641 297/118 |
| 8,579,375 | B2* | 11/2013 | Marais | B60N 2/02 297/342 X |
| 8,899,674 | B2* | 12/2014 | Yagi | A47C 1/035 297/343 |
| 8,955,178 | B2* | 2/2015 | Robertson | A47C 20/041 5/613 |
| 10,427,794 | B2* | 10/2019 | Erhel | B60N 2/34 |
| 11,401,038 | B1* | 8/2022 | Warwick | B64D 11/064 |
| 2014/0300161 | A1 | 10/2014 | Beroth et al. | |
| 2015/0284087 | A1* | 10/2015 | Henshaw | B64D 11/064 297/342 X |
| 2016/0144964 | A1* | 5/2016 | Braca | B64D 11/064 297/284.3 |
| 2017/0313213 | A1* | 11/2017 | Meister | B64D 11/0641 |
| 2018/0086468 | A1* | 3/2018 | Beroth | B60N 2/23 |
| 2018/0362165 | A1* | 12/2018 | Texeraud | B64D 11/0604 |
| 2022/0087438 | A1* | 3/2022 | Robertson | A47C 17/16 |
| 2022/0267008 | A1* | 8/2022 | Shiels | A47C 1/03294 |

FOREIGN PATENT DOCUMENTS

| | | |
|---|---|---|
| GB | 2331237 A | 5/1999 |
| GB | 2459606 A | 11/2009 |
| GB | 2539913 A | 1/2017 |
| WO | 2012135250 A1 | 10/2012 |
| WO | 2015097630 A1 | 7/2015 |
| WO | 2008107689 A1 | 9/2018 |

OTHER PUBLICATIONS

United Kingdom Patent Application No. 1911278.8, Search Report, dated Feb. 3, 2020.

* cited by examiner

AIRCRAFT SEAT WITH MECHANISM FOR SEAT ACTUATION

CROSS-REFERENCE TO RELATED APPLICATIONS

This application is a national stage application of International Patent Application No. PCT/GB2020/051718, filed on Jul. 17, 2020, and titled "Aircraft Seat with Mechanism for Seat Actuation," which is related to and claims priority to United Kingdom Patent Application No. 1911278.8, filed on Aug. 7, 2019, and titled "Aircraft Seat and Mechanism for Seat Actuation," both of which are hereby incorporated by reference in their entireties.

FIELD OF THE INVENTION

The present invention concerns an aircraft seat. More particularly, but not exclusively, this invention concerns an aircraft seat moveable between an upright position and a bed position. The invention also concerns an actuation mechanism for controlling the movement of an aircraft seat between an upright position and a bed position.

BACKGROUND OF THE INVENTION

Various aircraft seats exist which are movable between an upright position, for example a taxi, take-off, and landing (TTL) position, and a bed position. The aircraft seat may also be moveable into a "lounge" position, and/or a "dine" position, in which the seat position is optimised for passenger comfort. Typically, an aircraft seat comprises a back rest and a connected seat pan, with the seat pan comprising a cam follower arranged to follow a track which controls the angle of the seat pan and back rest as the seat moves between the upright position and the bed position. An actuator is used to move the seat between the various positions. However, when a passenger is using the seat, moving the seat between the upright position and bed position can result in excessive loads being experienced by the actuator, potentially causing damage to the seat. This may be a particular problem when moving from a bed position back to an upright position, where the passenger load on the seat which needs to be overcome may be greatest.

The present invention seeks to mitigate the above-mentioned problems.

SUMMARY OF THE INVENTION

The present invention provides, according to a first aspect, an aircraft seat comprising a back rest, a connected seat pan, and an actuator for moving the aircraft seat between an upright position and a bed position, the seat pan comprising a cam follower, the aircraft seat further comprising a first cam path and a second cam path, wherein the cam follower is arranged to move along the first cam path when the aircraft seat is moved from the upright position to the bed position, and the cam follower is arranged to move along the second cam path when the seat is moved from the bed position to the upright position.

Advantageously, provision of a first cam path and second cam path allows for the adjustment of loads experienced by the aircraft seat when it moves between the upright position and the bed position. For example, the second cam path, which is followed when the aircraft seat is moved from the bed position to the upright position, may be chosen such that the seat back is moved to substantially the upright position before any significant rotational or upwards movement of the seat pan takes place. In such an arrangement, the actuator moving the aircraft seat only has to act against the load on the seat back, rather than the load on the seat back and the seat pan as in prior art arrangements. Once the seat back is in, or close to, the upright position, the second cam path may be arranged such that the actuator moving the seat then moves the angular position of the seat pan away from the bed position and back into the upright position, and also moves the seat pan upwards into a more comfortable seating position. However, as the seat back is already in, or close to, the upright position, the only load that needs to be overcome is the load on the seat pan. As lower loads are experienced by the actuator, the actuator is less likely to be damaged, and/or a smaller/lower capacity actuator may be used.

The first cam path may comprise one or more sections which are coincident with the second cam path. The first cam path may comprise a first section which is coincident with the second cam path, a second section which is not coincident with the second cam path, and a third section which is coincident with the second cam path. The second section may be located between the first section and third section. The first cam path and second cam path may comprise one or more biased, for example, spring loaded, gates to control the movement of the cam follower. For example, there may be a biased gate at the junction between the first section of the first cam path and the second section of the first cam path. The biased gate may allow movement of the cam follower along the first cam path and prevent movement along the second cam path when the seat is moving from the upright position to the bed position. There may be a biased gate at the junction between the second section of the first cam path and the third section of the cam path. The biased gate may allow movement of the cam follower from the second section to the third section of the first cam path when the seat is moving from the upright position to the bed position. The biased gate may also be arranged such that it prevents movement of the cam follower from the third section to the second section of the first cam path when the seat is being moved from the bed position to the second position. Instead, the biased gate may guide the cam follower onto the second cam path, specifically the section of the second cam path which is not coincident with the first cam path. Such an arrangement ensures that the different cam paths are followed, depending on whether the seat is moving from the upright to bed position, or vice versa.

A further potential advantage of the provision of two distinct cam paths is the creation of additional seat positions as the aircraft seat is moved between the upright position and the bed position. When only a single cam path is used, the seat position will move between the same positions between the two end points. By using two distinct cam paths, the seat positions when following the first cam path may be different to the seat positions when following the second cam path.

The upright position may be a taxi, take-off, and landing position.

The first cam path may comprise a "lounge" point, at which, when the cam follower is located at the lounge point, the aircraft seat is in a lounge position which provides more comfort to a passenger than the upright position. For example, the seat back and seat pan may be more inclined than in the upright position. The second cam path may comprise a "dine" point, at which, when the cam follower is at the dine point, the aircraft seat is close to the upright position in seat back and seat pan angles, but located forward of the upright position, for example to allow easier access to a table for dining. The lounge point and the dine point may be located on sections of the first cam path and second cam path that are not coincident.

According to a second aspect of the invention there is also provided a method of moving an aircraft seat according to the first aspect of the invention from an upright position to a bed position, the method comprising the step of activating the actuator such that the cam follower follows the first cam path, thereby moving the aircraft seat from the upright position to the bed position.

According to a third aspect of the invention, there is also provided a method of moving an aircraft seat according to the first aspect of the invention from a bed position to an upright position, the method comprising the step of activating the actuator such that the cam follower follows the second cam path, thereby moving the aircraft seat from the bed position to an upright position.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
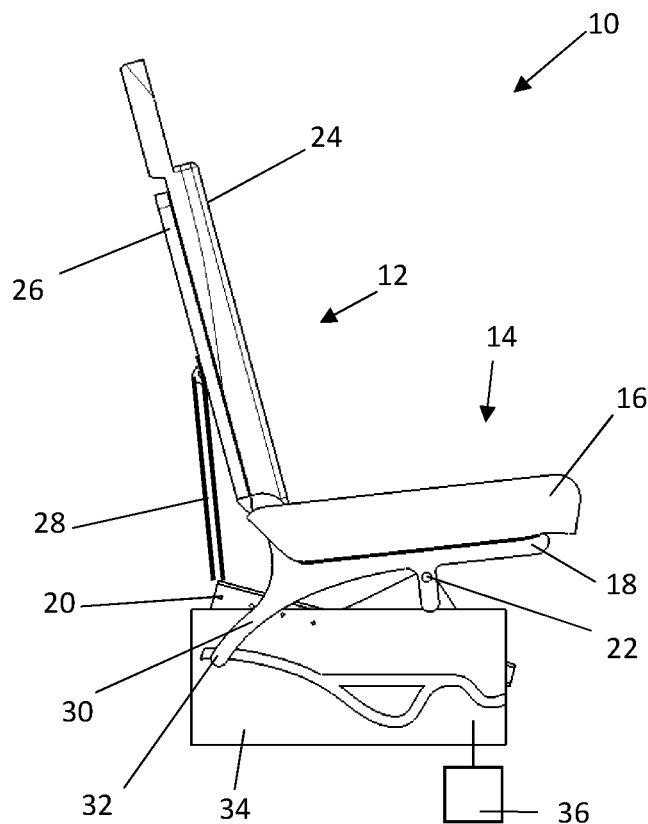
FIG. 1 shows a schematic side view of an aircraft seat according to a first embodiment of the invention in a TTL position.
Figure 2:
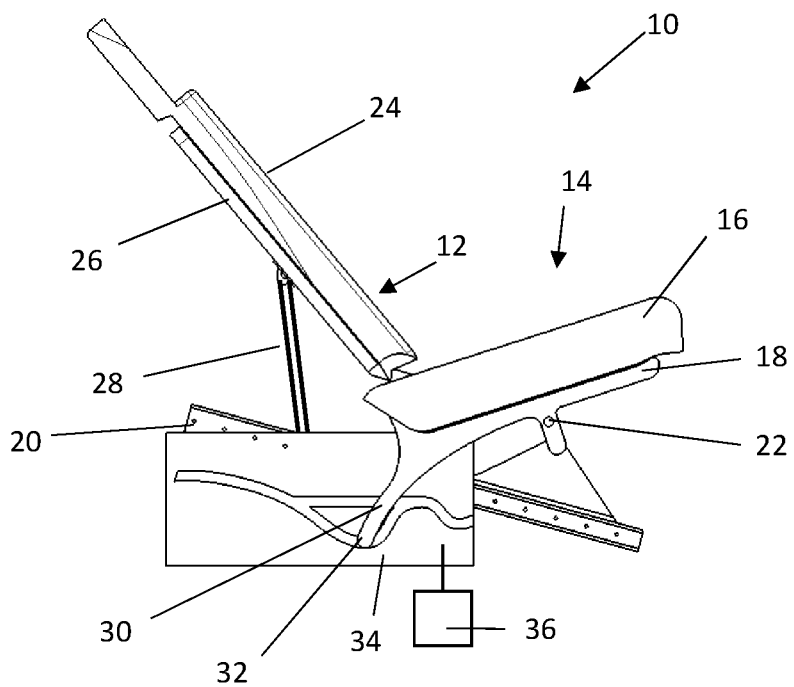
FIG. 2 shows a schematic side view of the aircraft seat shown in FIG. 1 in a lounge position.
Figure 3:
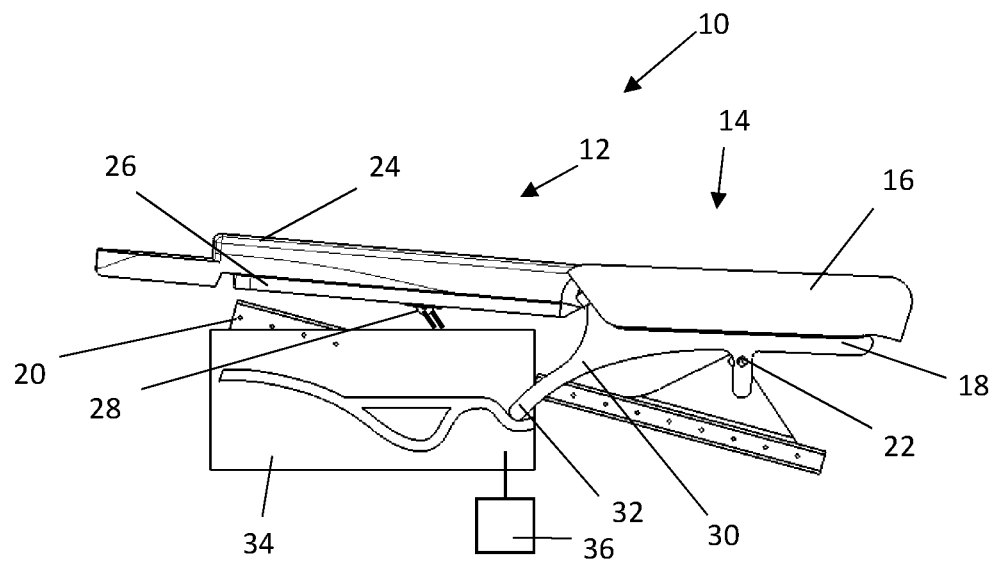
FIG. 3 shows a schematic side view of the of the aircraft seat shown in FIG. 1 in a bed position.
Figure 4:
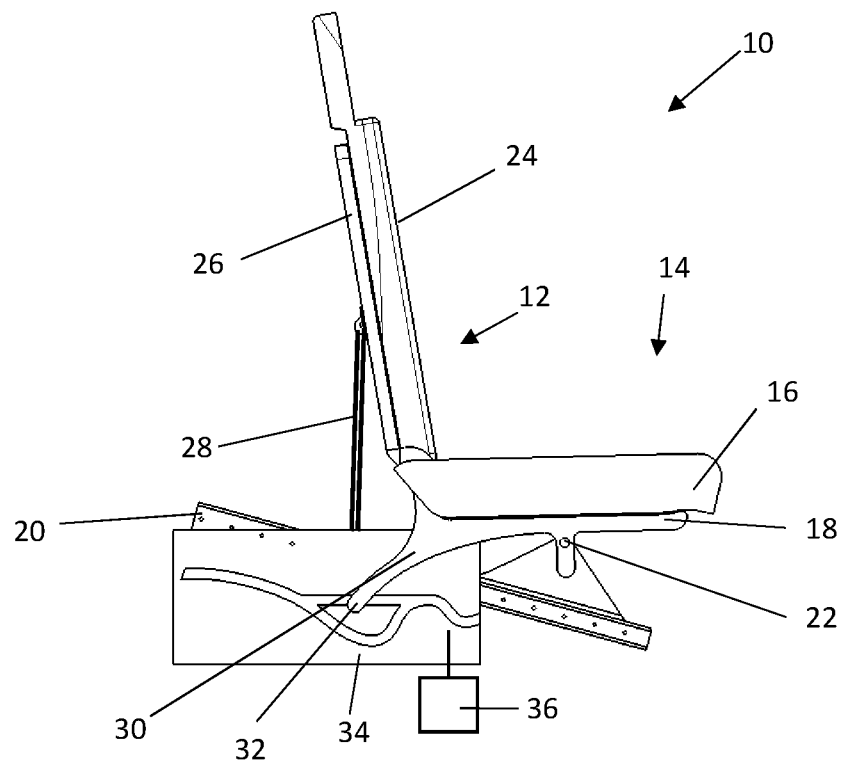
FIG. 4 shows a schematic side view of the aircraft seat shown in FIG. 1 in a dine position.

FIG. 1 shows an aircraft seat 10 comprising a seat back 12 and a seat pan 14. The seat pan 14 comprises a cushioned support 16 for a passenger to sit on, the cushioned support located on a seat pan chassis 18. The seat pan chassis 18 is pivotally connected to a slide 20 by a pivot 22. The slide 20 is inclined to the horizontal, and is arranged to move forwards to move the aircraft seat 10 into a bed position, and backwards to return the aircraft seat from a bed position to a TTL position. The terms forwards and backwards will be understood to be defined with reference to the direction in which the seat is facing. The slide may take a number of forms as would be understood by the skilled person, for example a two-part telescopic slide, with one part of the slide being housed in the other part of the slide, and extendible forwards and backwards as required. The seat back 12 also comprises a cushioned support 24 and a seat back chassis 26, with the seat back chassis 26 pivotally connected to the slide 20 by a connecting rod 28. The seat pan chassis 18 is pivotally connected to the seat back chassis 26, the pivotal connection towards the rear of the seat pan chassis 18 and at the base of the seat back chassis 26. The seat pan chassis 18 further comprises a connection arm 30, with a cam follower 32 located at the distal end of the connection arm 30. The aircraft seat 10 further comprises a side chassis 34 which includes a first cam path and a second cam path. The cam follower 32 is located such that is it restrained within the first cam path and/or second cam path. A mirror arrangement may be provided to the opposite side of the aircraft seat 10, as would be easily understood by a skilled person. As such, only a single side will be described. An actuator 36 is arranged to drive the slide forwards or backwards depending on the control signals received from an actuator control unit (not shown). Various different actuators may be used as would be understood by the skilled person and as such, for clarity, the actuator 36 is shown highly schematically. The actuator control unit may be housed, for example, on a side arm of the aircraft seat 10, to allow easy adjustment by a passenger using the aircraft seat 10. The first cam path 38 and second cam path 40 can be better seen in FIG. 5. The first cam path 38 and second cam path 40 share a first section 42, diverge for a second section 44, and then come back together for a third section 46. A first biased gate 48 is located at the boundary between the first section 42 and second section 44. A second biased gate 50 is located at the boundary between the second section 44 and the third section 46. The first cam path 38 is followed by the cam follower 32 as the aircraft seat 10 is moved from the TTL position shown in FIG. 1, to a lounge position shown in FIG. 2. In the lounge position, the actuator 36 has driven the slide 20 forwards, which moves the seat pan 14 forwards, and as a result of the cam follower 32 moving in the first cam path 38 increases the angle made between the seat pan 14 and the horizontal. The seat back 12 is also moved forwards, and inclined to reduce the angle made with the horizontal. Such a position is typically more comfortable for a passenger, and may be used, for example, for reading or watching in-flight entertainment. The aircraft seat 10 is further moved into the bed position as shown in FIG. 3 by the actuator 36 continuing to drive the slide 20 forwards such that the seat pan 14 and the seat back 12 become approximate horizontal. Where the term horizontal is used, the skilled person will appreciate that the term is with respect to the floor of an aircraft cabin to which the aircraft seat 10 may be fixed. Also, in the bed position, the approximately horizontal position may actually be inclined by a few degrees in order to compensate for the typical "nose up" orientation of most aircraft during flight. In order to move the aircraft seat 10 back into the TTL position shown in FIG. 1, the actuator 36 drives the slide 20 backwards. As can be seen in FIG. 4, the cam follower 32 then follows the second cam path 40, resulting in the aircraft seat 10 entering a dine position, in which the seat back 12 is located in a more upright position than in the lounge position, and the seat pan 14 is located in a more horizontal position than in the lounge position. However, both the seat back 12 and the seat pan 14 are located forward of the TTL positions shown in FIG. 1. As can be seen in the figures, the cam follower 32 following the second cam path 40 results in the seat back 12 being moved into an upright position before any significant rotational or vertical movement of the seat pan 14 takes place. This may be contrasted with the movement enabled by following the first cam path 38, where the angular positions of the seat back 12 and seat pan 14 are changed at the same time. Continuing to drive the slide 20 backwards results in the aircraft seat 10 returning to the TTL position as shown in FIG. 1.

Figure 5:
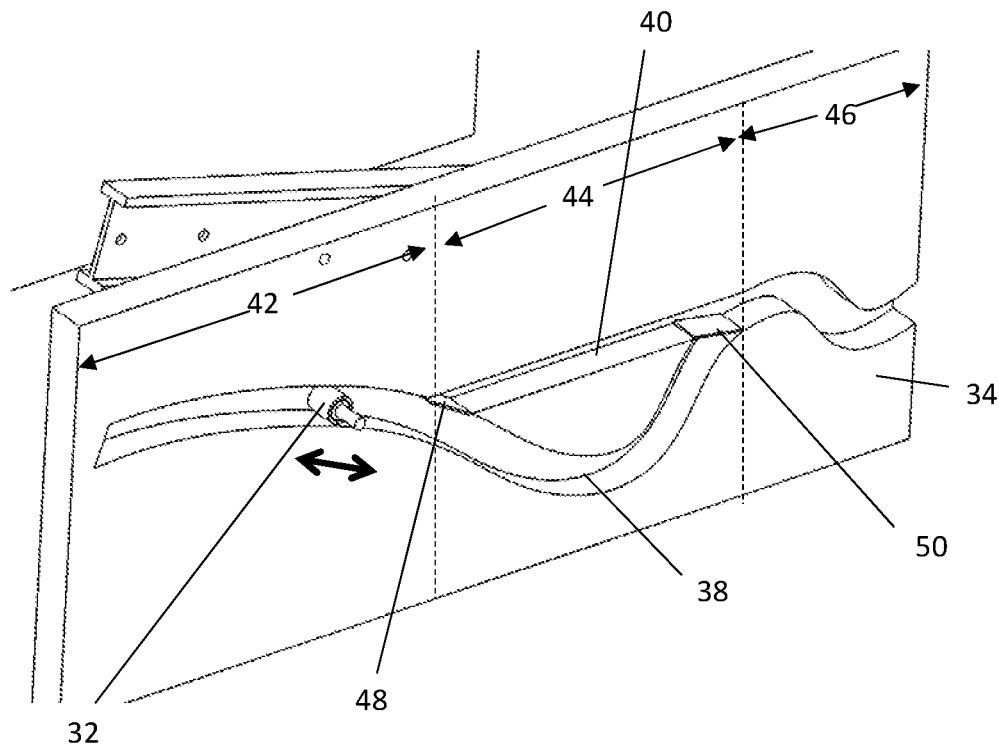
FIGS. 5 to 12 show an enlarged view of the side chassis of the aircraft seat of FIG. 1, with the cam follower in various positions as described.

Further details of the first cam path 38 and second cam path 40 are shown in FIGS. 5 to 12. FIG. 5 shows the aircraft seat 10 in the TTL position. The first cam path 38 acts with the slide 20 to control the angle of the seat pan 14 and the angle of the seat back 12 as the slide 20 is moved forwards.

Figure 6:
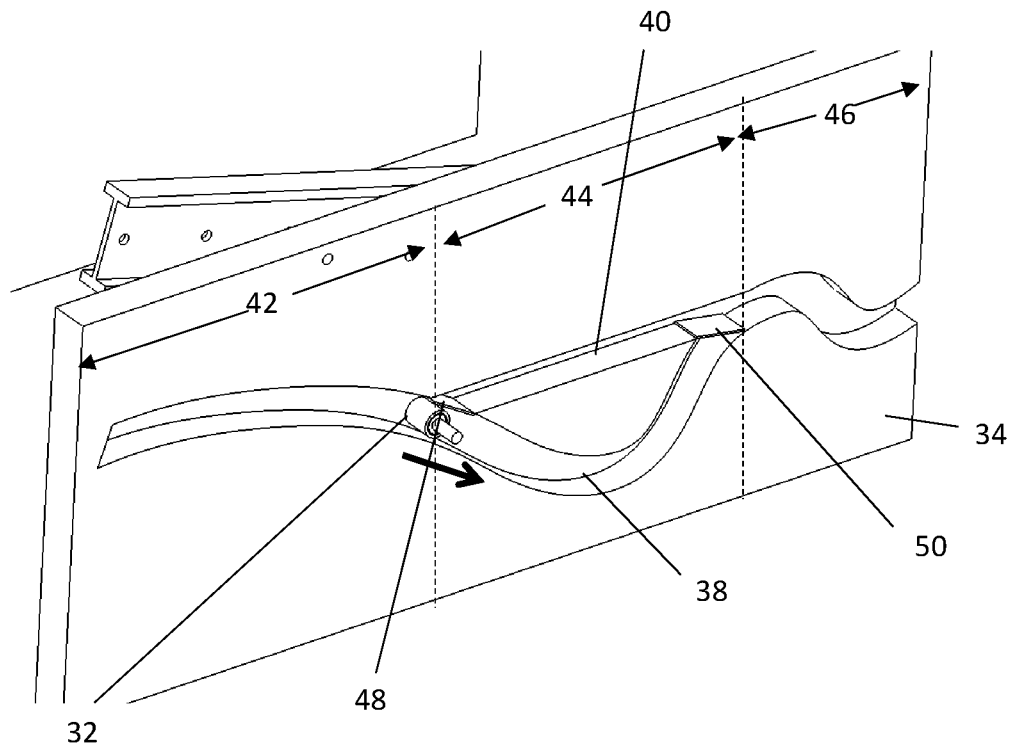
Figure 7:
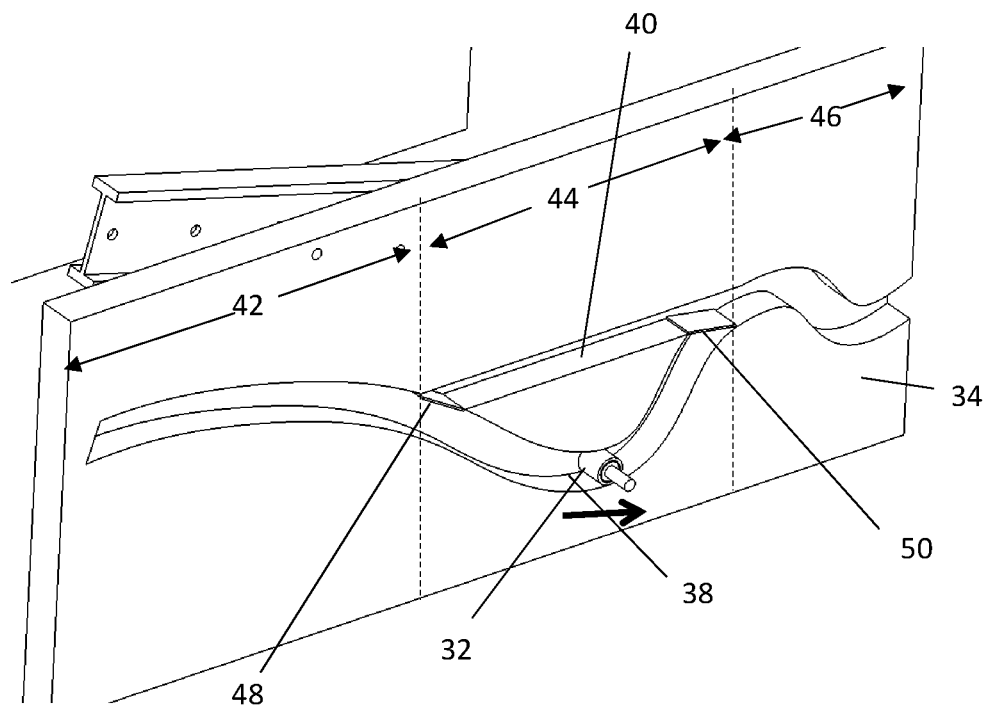
Figure 8:
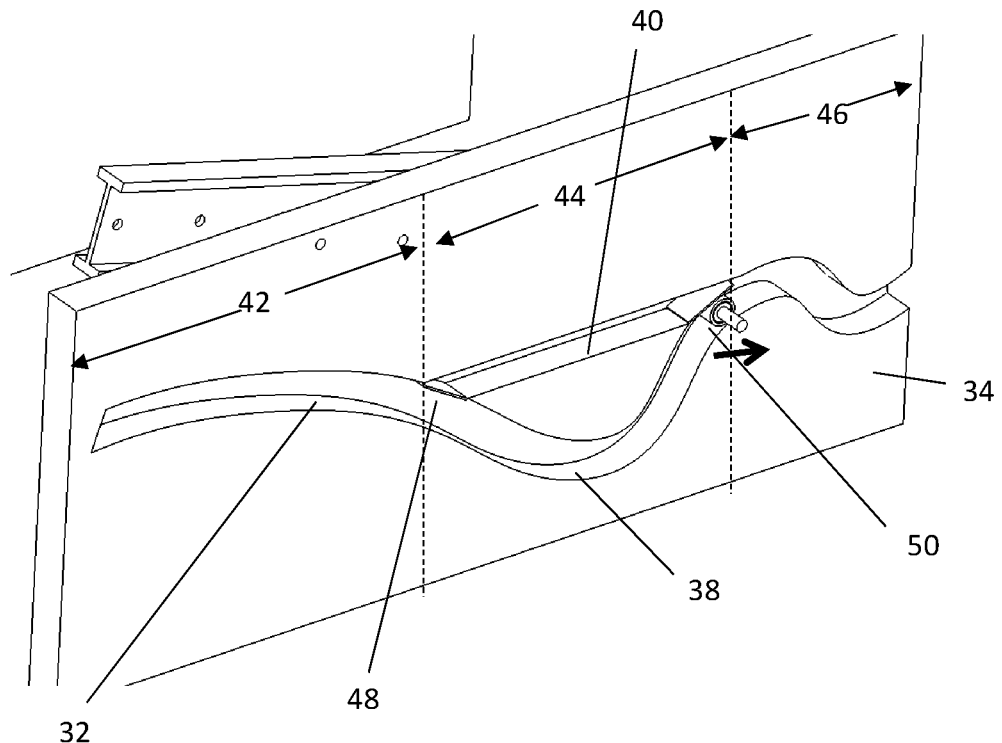
Figure 9:
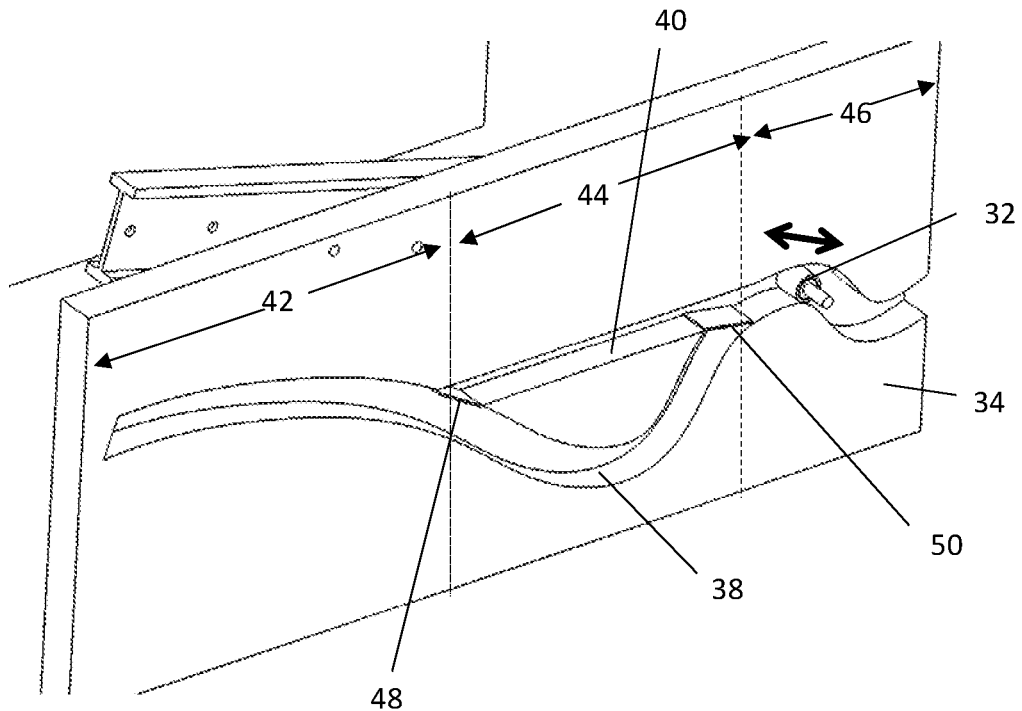
Figure 10:
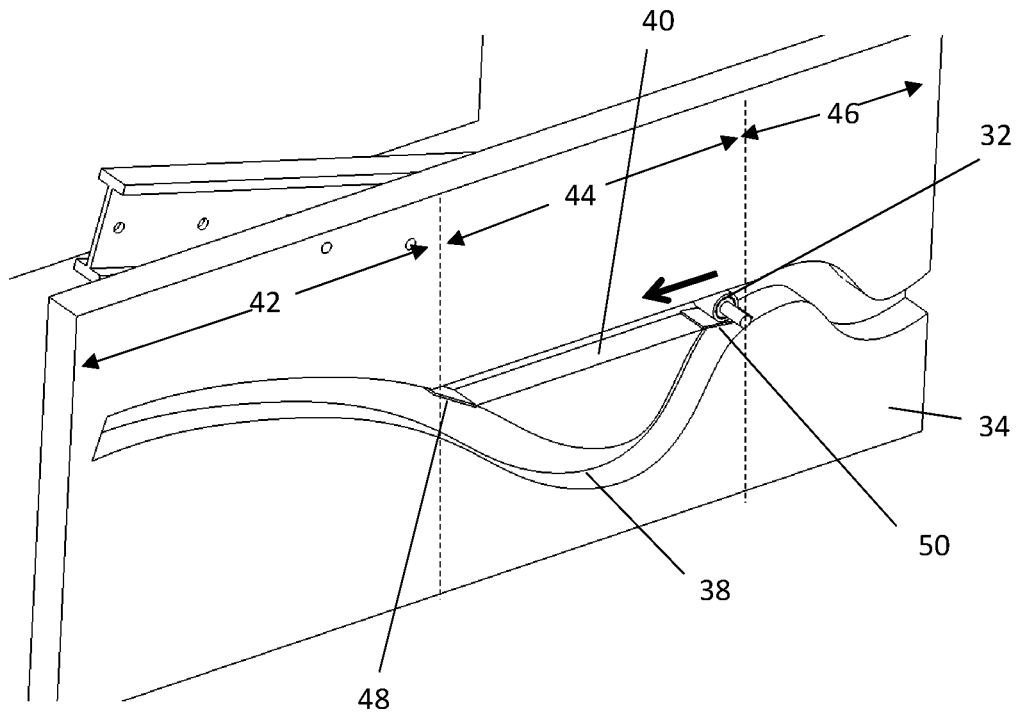
Figure 11:
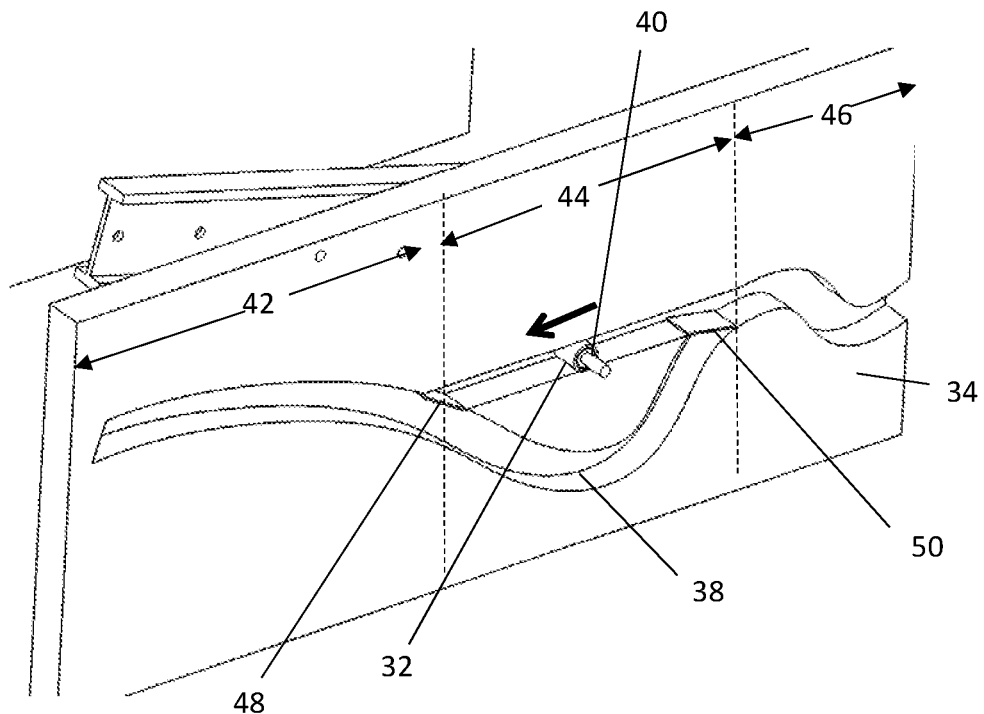
Figure 12:
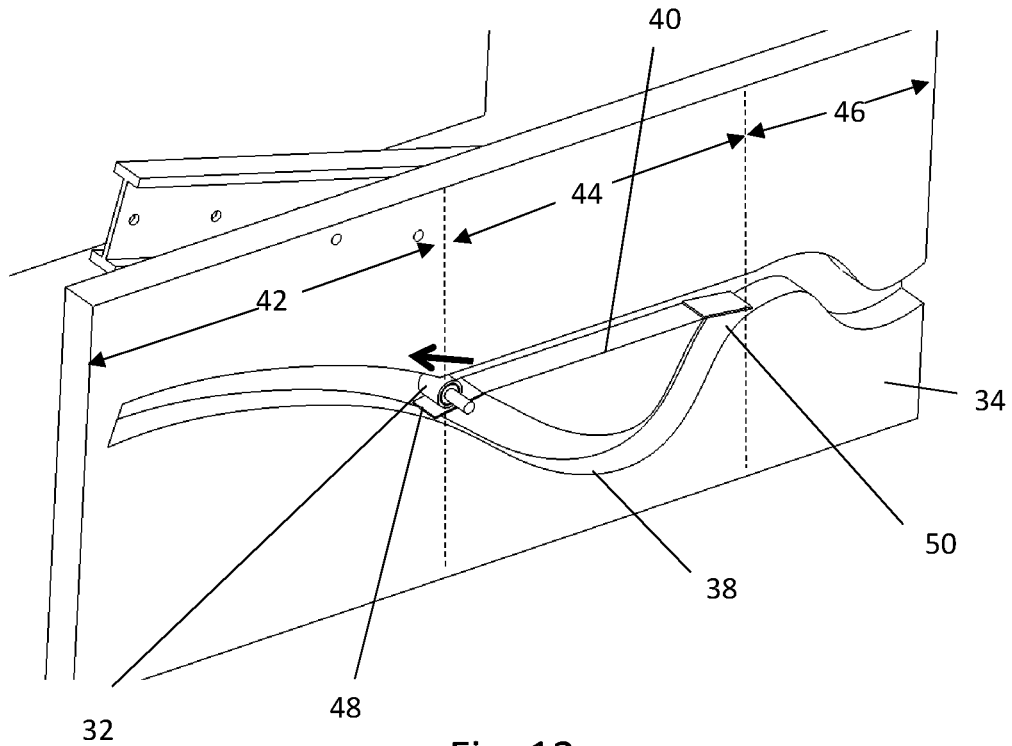

An initial downwards curve results in the seat back 12 tilting backwards as the seat pan 14 is moved forwards. FIG. 6 shows the cam follower 32 moving into the second section of the first cam path 38, where the first cam path 38 diverges from the second cam path 40. The first biased gate 48, for example a sprung latch gate, blocks the second cam path 40, ensuring that the first cam path 38 is followed. The first cam path 38 continues in a downwards curve until reaching an inflection point, at which point the aircraft seat 10 is in the lounge position. FIG. 8 shows the cam follower 32 moving into the third section 46, where the first cam path 38 and second cam path 40 re-join. The second biased gate 50 is opened by the cam follower 32 moving along the first cam path 38 and returns to the closed position under bias once the cam follower 32 has passed into the bed position, as shown in FIG. 9. FIG. 10 shows the cam follower 32 as the seat pan 14 is being driven back from the bed position, into the dine position. The second biased gate 50 directs the cam follower 32 onto the second section of the second cam path 40, which is approximately horizontal between the third section 46 and the first section 42. FIG. 11 shows the cam follower 32 when the aircraft seat 10 is located in the dine position. Further driving of the slide 20 backwards results in the cam follower moving from the second section 44 of the second cam path 40 onto the first section 42 shared by both the first cam path 38 and the second cam path 40. The cam follower 32 opens the first biased gate 48 in order to allow transition onto the shared section, as shown in FIG. 12. The aircraft seat 10 is then returned to the TTL position as shown in FIG. 5.

Whilst the present invention has been described and illustrated with reference to particular embodiments, it will be appreciated by those of ordinary skill in the art that the invention lends itself to many different variations not specifically illustrated herein. For example, the aircraft seat may comprise two slides, one located to each side of the seat. The aircraft seat may comprise two sets of first and second cam paths, one located to each side of the seat. In such a scenario, a cam follower would be provided and associated with each set of cam paths.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft seat comprising a back rest and connected seat pan, an actuator for moving the aircraft seat between an upright position and a bed position, the seat pan comprising a cam follower, the aircraft seat further comprising a first cam path and a second cam path, wherein the cam follower is arranged to move along the first cam path when the aircraft seat is moved from the upright position to the bed position, and the cam follower is arranged to move along the second cam path when the seat is moved from the bed position to the upright position.

2. An aircraft seat as claimed in claim 1, wherein the second cam path, which is followed when the aircraft seat is moved from the bed position to the upright position, is chosen such that the back rest is moved to substantially the upright position before movement of the seat pan takes place.

3. An aircraft seat as claimed in claim 1, wherein the first cam path comprises one or more sections which are coincident with the second cam path.

4. An aircraft seat as claimed in claim 3, wherein the first cam path comprises a first section which is coincident with the second cam path, a second section which is not coincident with the second cam path, and a third section which is coincident with the second cam path.

5. An aircraft seat as claimed in claim 4, wherein the second section is located between the first section and third section.

6. An aircraft seat as claimed in claim 1, wherein the first cam path and second cam path comprise one or more biased gates to control the movement of the cam follower.

7. An aircraft seat as claimed in claim 6, comprising a biased gate at the junction between a first section of the first cam path and a second section of the first cam path.

8. An aircraft seat as claimed in claim 6, comprising a biased gate at the junction between a second section of the first cam path and a third section of the first cam path.

9. An aircraft seat as claimed in claim 1, wherein the upright position is a taxi, take-off, and landing position.

10. An aircraft seat as claimed in claim 1, wherein the first cam path comprises a lounge point, at which the aircraft seat is in a lounge position which provides more comfort to a passenger than the upright position.

11. An aircraft seat as claimed in claim 10, wherein the second cam path comprises a dine point, at which the aircraft seat is close to the upright position in back rest and seat pan angles, but located forward of the upright position.

12. An aircraft seat as claimed in claim 11, wherein the lounge point and the dine point are located on respective sections of the first cam path and second cam path that are not coincident.

13. A method of moving an aircraft seat according to claim 1 from an upright position to a bed position, the method comprising the step of activating the actuator such that the cam follower follows the first cam path, thereby moving the aircraft seat from the upright position to the bed position.

14. A method of moving an aircraft seat according to claim 1 from a bed position to an upright position, the method comprising the step of activating the actuator such that the cam follower follows the second cam path, thereby moving the aircraft seat from the bed position to an upright position.

* * * * *